US005903450A

United States Patent [19]

Johnson et al.

[11] Patent Number: 5,903,450

[45] Date of Patent: May 11, 1999

[54] ELECTROSTATIC PRECIPITATOR POWER SUPPLY CIRCUIT HAVING A T-FILTER AND PI-FILTER

[75] Inventors: Nathaniel M. Johnson, Laconia; S. Edward Neister, New Durham, both of N.H.

[73] Assignee: Zero Emissions Technology Inc., New Durham, N.H.

[21] Appl. No.: 09/059,656

[22] Filed: Apr. 13, 1998

Related U.S. Application Data

[63] Continuation-in-part of application No. 08/759,966, Nov. 27, 1996, Pat. No. 5,740,024, which is a continuation-in-part of application No. 08/417,130, Apr. 5, 1995, Pat. No. 5,629,842.

[51] Int. Cl.[6] .......... H02M 1/12

[52] U.S. Cl. .......... 363/47; 323/903

[58] Field of Search .......... 363/45, 46, 47; 323/903; 95/2; 96/15

[56] References Cited

U.S. PATENT DOCUMENTS

| | | |
|---|---|---|
| 1,340,027 | 5/1920 | Dunham . |
| 4,290,003 | 9/1981 | Lanese . |
| 4,390,831 | 6/1983 | Byrd et al. . |
| 4,587,475 | 5/1986 | Finney, Jr. et al. . |
| 4,694,387 | 9/1987 | Walker . |
| 4,760,484 | 7/1988 | Walker . |
| 5,255,178 | 10/1993 | Liberati . |
| 5,378,978 | 1/1995 | Gallo et al. .......... 323/903 |

FOREIGN PATENT DOCUMENTS

| | | |
|---|---|---|
| 0208822 | 1/1987 | European Pat. Off. . |
| 2590071 | 5/1987 | France . |
| 1074098 | 1/1960 | Germany . |
| 1108308 | 6/1961 | Germany . |
| 1614470 | 9/1970 | Germany . |

OTHER PUBLICATIONS

Patent Abstracts of Japan, vol. 010, No. 217 (E–423), Jul. 29, 1986, Ricoh Co. Ltd., Reducing Method of Radiation Noise of High Voltage Device.

*Primary Examiner*—Shawn Riley
*Attorney, Agent, or Firm*—Phillip E. Decker

[57] ABSTRACT

An electrical filter apparatus for an electrostatic precipitator, wherein the filter apparatus is a T-type or pi-type filter electrically connected to a high voltage output of an electrostatic precipitator power supply and an electrostatic precipitator electrode. The T-type filter comprises a first inductor electrically connected to the high voltage output and a capacitor that is also electrically connected to ground. A second inductor is connected to the first inductor and the electrostatic precipitator electrode. In another embodiment, a two-stage inductor assembly is provided having a third inductor member defined by a plurality of turns of a continuous length of wire, and a fourth inductor member defined by a plurality of ferrite beads in end-to-end relationship.

13 Claims, 3 Drawing Sheets

ELECTROSTATIC PRECIPITATOR POWER SUPPLY CIRCUIT HAVING A T-FILTER AND PI-FILTER

This is a continuation-in-part of application Ser. No. 08/759,966, filed Nov. 27, 1996, U.S. Pat. No. 5,740,024, which is a continuation-in-part of application Ser. No. 08/417,130, filed Apr. 5, 1995, U.S. Pat. No. 5,629,842.

BACKGROUND a. Field of the Invention

The present invention relates to electrical filtering apparatuses used to filter the power input to an electrostatic precipitator.

b. Description of the Related Art

Electrostatic precipitators have taken on considerably greater importance in recent years, particularly in view of the increased emphasis upon maintaining a clean environment. That increased importance includes the need for more effective air pollution control by maintaining clean exhausts from industrial processes that involve either the combustion of fuels or the reaction or transformation of materials in chemical processing operations that result in the generation of particulate matter as a consequence of carrying out the process. The techniques and structural elements incorporated in modern electrostatic precipitators, particularly the electrical control apparatus for controlling the power provided for imparting a charge to the particulate matter to be collected, as well as the power provided to the collection surfaces, have been continually refined to more completely remove undesirable particulate materials from stack gases and also to provide longer useful operating life for the precipitator components. The stack gases in connection with the electrostatic precipitators are often necessary to meet environmental regulations include chemical process and cement plant exhaust gases, fossil fuel electric generating plant exhaust gases, and exhaust gases from steam generation boilers, such as those commonly associated with paper mills for processes such as paper web drying, where scrap "black liquor" from wood processing operations and other fossil fuels are often the fuel sources.

The theory behind the operation of an electrostatic precipitator involves the generation of a strong electrical field through which stack gases pass, so that the particulates carried by the stack gases can be electrically charged. By charging the particles electrically they can be separated from the gas stream and collected, and thereby not enter and pollute the atmosphere. The generation of such electrical fields requires electrical power supplies that can provide a high DC voltage to charge the particulate matter and thereby permit its collection. The existing systems are most often based upon AC corona theory, using a single phase transformer-rectifier (T/R) set to rectify AC power to DC power and provide a high DC potential between a charging electrode and a collection surface, usually a plate, to charge the particles by subjecting the stack gases to the maximum possible current without complete breakdown. That approach is believed to produce the maximum efficiency in effecting removal of such particles.

The emphasis in particulate removal is generally placed on increasing the current flow between a grid and a plate defining the electrostatic precipitator collection surfaces, to a current level that produces a maximum of sparking between the grid and the plate. In fact, some precipitators incorporate a grid structure that contains barbed wire such as DRAGON'S TEETH electrodes or special pointed rods, specifically to enhance such sparking. The sparking inside a precipitator is believed to be necessary as an indicator that the maximum possible current is being drawn, and therefore that the maximum possible ionization of the gases and particles is taking place. In fact, the practice of encouraging sparking is emphasized, even though it is known that sparking produces stresses upon the electrical components of the system, it causes increased precipitator maintenance because of the production of agglomerated particles, sometimes called "ash balls" or "klinkers," and it also causes difficulty in insuring that the rappers, which are devices that vibrate the precipitator plates to remove collected particles, are in fact operative and are removing collected particulate material.

A problem that results from operating an electrostatic precipitator as levels at which sparking occurs is the prevention of damaging arcing. An automatic controller for the input power to the T/R set must sense incipient arcing and immediately reduce the voltage on the precipitator collector plate, because any spark can quickly create an arc between the plate and the electrode, with a resultant high current flow. The high current flow can cause severe damage to the precipitator grid or plate. Additionally, arcing can cause the T/R set to fail, it can cause the controller to fail, or it can open the overcurrent protectors that are provided in the incoming power line. Any of those incidents will cause a section of the precipitator to be temporarily off-line, with the resultant undesirable passing of greater amounts of particulates into the atmosphere until the damage to the precipitator has been repaired. Repair can be a matter of minutes, or it can be weeks if the T/R set or controller has to be replaced.

Heretofore, the prevention of arcing has been attempted by providing complicated sensing and control circuits that add expense to the cost for an electrostatic precipitator. Examples of such circuits are shown in U.S. Pat. Nos. 4,290,003, which issued on Sep. 15, 1981, to Philip M. Lanese; 4,390,831, which issued on Jun. 28, 1983, to William Byrd et al.; 4,587,475, which issued on Oct. 19, 1993, to Gugliemo Liberati. However, the presently available circuits, although effective to some degree, still permit sparking and arcing to occur, thereby requiring more frequent maintenance of the precipitator to repair the damage that is caused by such sparking and arcing. Maintenance involves down time for the precipitator, and usually for the system in which the precipitator is installed, thereby increasing the cost for producing the product of the system in which the precipitator is employed.

In many electrostatic precipitators sulfur trioxide or ammonia, or both, must be injected into the gas stream in order to keep the opacity of the stack gases as low as possible. However, the use of such gases is undesirable because of their caustic nature, that over time causes damage to the precipitator and the stack, again necessitating repair and consequent down time of the process or equipment with which the precipitator is employed.

What is needed, therefore, is an electrical filter apparatus for electrostatic precipitators that provides higher output voltage, reduced voltage ripple, and lower high frequency energy, thereby increasing the ability of precipitators to collect particulate emissions from fossil-fueled boilers and reduce stack opacity.

SUMMARY

The present invention is directed to an apparatus that satisfies these needs. The apparatus is a T-type filter connected between the high voltage output of an electrostatic precipitator power supply and an electrostatic precipitator electrode. The T-type filter comprises a first inductor and and a second inductor connected in series between the power supply and the electrode, and a capacitor connected to ground and the terminal at the junction of the first and second inductor. Another embodiment is a pi-type filter, which does not have the first inductor of the T-type filter, but includes the capacitance of the electrostatic precipitator (ESP) as one leg of the "pi". These and other embodiments, features, aspects, and advantages of the present inventions will become better understood with reference to the following drawings and description.

DRAWINGS

DESCRIPTION

Figure 2:
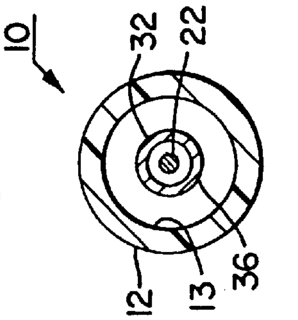
FIG. 2 is a transverse cross-sectional view of the inductor assembly shown in FIG. 1, taken along the line 2—2 thereof.
Figure 1:
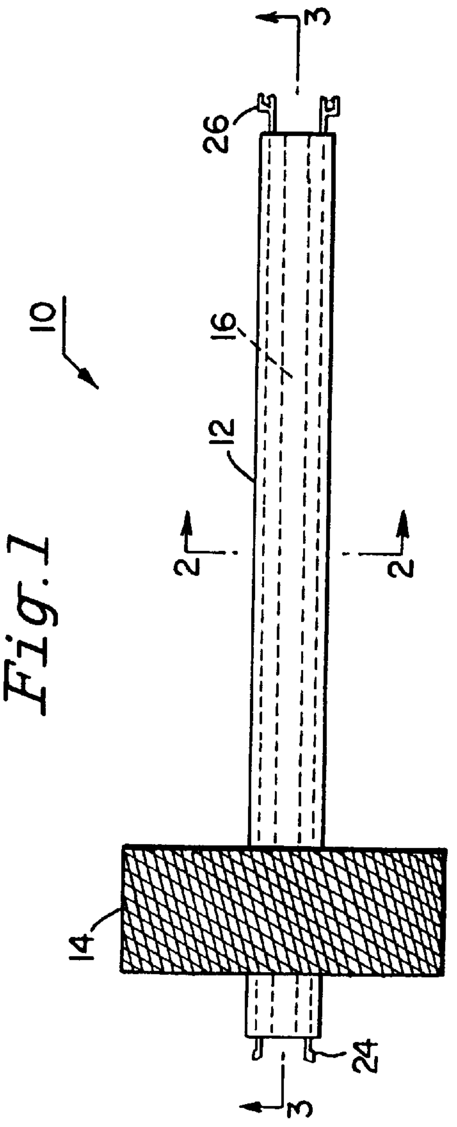
FIG. 1 is a side elevational view of a two-stage inductor assembly.
Figure 3:
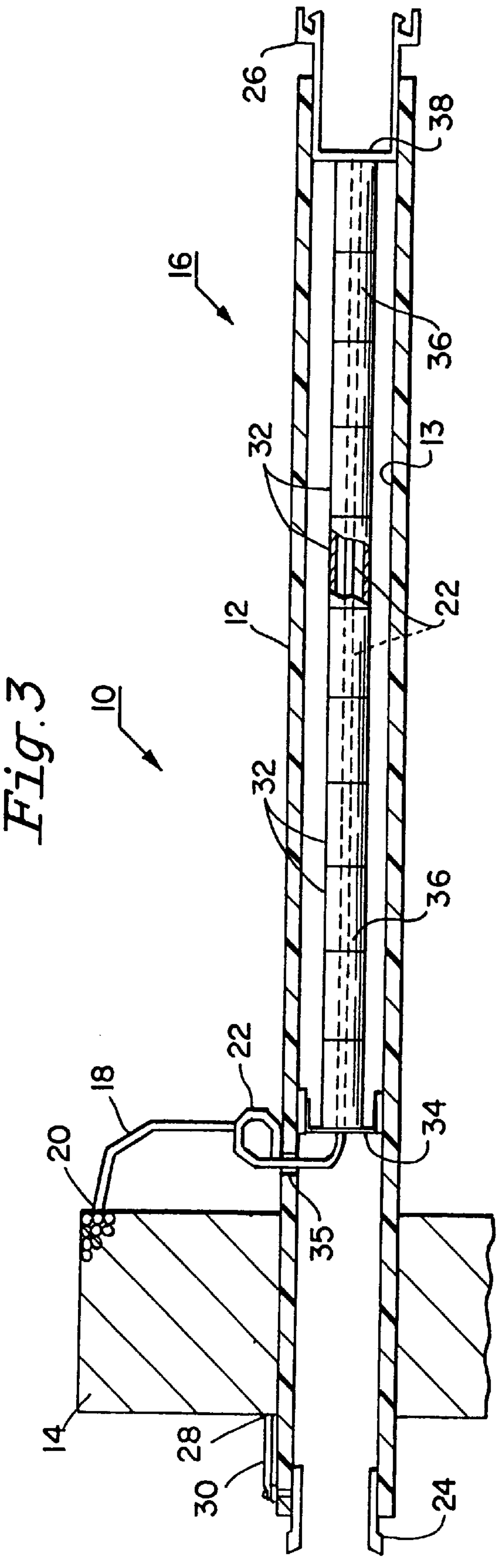
FIG. 3 is a longitudinal cross-sectional view of the inductor assembly of FIG. 1, taken along the line 3—3 thereof.

Referring now to the drawings, and particularly to FIGS. 1, 2, and 3 thereof, there is shown a high voltage inductor assembly 10. Inductor 10 is a two-stage inductor and includes a hollow elongated body member 12 that carries on its exterior a first inductor member 14, and that carries within its interior a second inductor member 16 (see FIG. 3). Second inductor member 16 is spaced longitudinally along body member 12 from first inductor member 14. A lead wire 18 extends between output terminal 20 of first inductor member 14 and an end of a conductor 22 that extends interiorly within body member 12 to support second inductor member 16 to provide an electrical connection between first and second inductor members 14 and 16 to connect them in series. It is not necessary that the first and second inductor members are carried on the same body member. Also, a plurality of first and second inductor members can be provided, depending upon the electrical characteristics of the existing system. It may be advantageous to provide one or more first inductor members 14 without the second inductor member 16. It may also be advantageous to provide one or more second inductor members 16 without the first inductor member 14, depending upon the electrical characteristics of the system.

Body member 12 is an elongated carrier that is shown in the form of a hollow tubular member, such as a hollow cylinder. Although shown as a cylindrical cross section in FIG. 2, body member 12 can be of any convenient cross-sectional shape, so long as it is capable of firmly carrying and supporting both first inductor member 14 and second inductor member 16. Preferably, body member 12 is made from an electrically non-conductive material that is capable of withstanding high ambient temperatures of the order of at least 260° C., without deformation or collapse. In that connection, it has been found that epoxy-impregnated fiberglass tubing or phenolic tubing provides the necessary physical attributes for satisfactory operation in connection with the present invention. Other materials are also suitable, as will be appreciated by those skilled in the art.

A pair of electrically conductive terminal connectors are securely carried at each end of body member 12, to permit connection of the two-stage inductor with the associated precipitator power supply circuit components, as will be hereinafter described. Typically, an input terminal connector 24 and an output terminal connector 26 can be made from brass, or from other electrically conductive materials, usually metallic materials, and can be provided in the form of unions of appropriate configuration, such as standard brass pipe unions, to firmly physically and electrically engage with the circuit elements with which the inductor member is connected. When provided in the form of brass unions, terminal connectors 24 and 26 can be soldered or brazed to copper conductors (not shown). The precise form of terminal connector will be dependent upon the nature of the cable or other components to which the two-stage inductor assembly is to be connected. The terminal connectors provide a convenient method for connecting the inductor with the transformer/rectifier precipitator bus, which typically includes ¾ inch unions carried by the bus and the inductor so that a simple mechanical connection can be made that also effects the electrical connection. Even though, both elements are shown connected mechanically, they can be made as separate assemblies, then connected electrically during installation on the ESP.

First inductor member 14 is a high-voltage, air core inductor that is of toroidal overall form and is defined by a multiplicity of turns of a continuous length of wire. The wire winding defining inductor member 14 is wound circularly about the central longitudinal axis passing through the central opening of the resulting toroid, in overlapping relationship, and it is securely carried on the outermost surface of body member 12, adjacent to input terminal connector 24 for convenient electrical connection thereto. Input terminal 28 permits electrical connection of inductor member 14 with input terminal connector 24 by a lead wire 30, or the like.

From the standpoint of inductance, first inductor member 14 can have an inductance that varies from about 0.5 henry to over about 25 henries, depending upon the particular power level for the circuit in which the inductor assembly is connected. The preferred embodiment is about 1 henry. In terms of size, first inductor member 14 generally ranges from about three inches (7 cm) to about five inches (13 cm) in width, and up to ten inches (25 cm) in outer diameter when formed from insulated copper wire that is wound to a large number of turns to provide the desired inductance to prevent the formation of spark leaders, and arcs in the particular precipitator circuit. Additionally, the multiplicity of turns of wire should be capable of carrying the required current without overheating because of $I^2R$ loss, and they are preferably vacuum-impregnated with a high temperature epoxy material of a type well known to those skilled in the art.

Second inductor member 16 is carried within the interior of body member 12, as more clearly seen in FIGS. 2 and 3. As shown, second inductor member 16 is defined by a plurality of end-to-end ferrite beads 32 having a generally tubular configuration. Each of ferrite beads 32 is carried on copper conductor 22 that is substantially coaxially supported within the interior of body member 12 by means of a press fit, for example, and output terminal connector 26. Conductor 22, which can also be provided in the form of a brass rod, is substantially aligned with the axis of tubular body member 12 between output terminal connector 26 and support member 34. Between support member 34 and first inductor member 14 conductor 22 passes transversely through the wall of body member 12 to be electrically connected with an end of lead wire 18 so that first and second inductors 14 and 16 are electrically connected in series and with each of input terminal connector 24 and output terminal connector 26.

Each of the ferrite beads 32 includes a generally centrally-provided axial passageway to permit the beads to be carried on the outer surface of conductor 22, which passes centrally through each of the beads to support the beads in axially aligned relationship. The number of ferrite beads 32 can be varied to obtain the total amount of ferrite to produce the inductance needed to provide the circuit impedance to offset the ripple current that is present in the output of the power supply for a particular electrostatic precipitator.

In one embodiment of the two-stage inductor assembly, the beads defining second inductor member 16 have an inner diameter of ¼ inch, an outer diameter of ⅝ inch, and a length of 1⅛ inches. As shown in FIG. 3, eleven such ferrite beads are positioned in axially aligned, end-to-end, contacting relationship on conductor 22. Preferably, conductor 22 is a solid copper conductor having an outer diameter of slightly less than about ¼ inch, for slideably receiving each of ferrite beads 32 thereon, and for supporting the several ferrite beads within body member 12. In that regard, as much ferrite as necessary to provide the correct inductance should be carried in the second inductor member without reaching the saturation limit for the direct currents that pass through the device, and for those alternating currents of different frequencies that also pass through the device. Preferably, the ferrite beads have the structure and composition as disclosed in U.S. Pat. No. 2,594,890, which issued on Apr. 29, 1952, to W. B. Ellwood, the disclosure of which is incorporated herein by reference to the same extent as if fully rewritten. The Ellwood patent provided an expression for calculating the inductance in henries for a conductor that carries a ferrite bead, wherein the inductance is based upon the size of the cylindrical ferrite bead and the permeability of the particular ferrite material.

As shown in FIG. 3, the end of conductor 22 that is closest to input terminal connector 24, and that extends axially of body member 12 for a small distance beyond forward support member 34, passes transversely through an aperture 35 provided in the wall of body member 12. Aperture 35 is at an axial position, along the axis of body member 12, that lies between first inductor member 14 and second inductor member 16, and permits electrical connection of conduction 22 with output terminal 20 of first inductor member 14 by means of lead wire 18. In that regard, lead wire 18 can be a high-voltage silicon lead wire, which is a preferred form a lead wire for use as part of the inductor in accordance with the two-stage inductor assembly when it is installed in an electrostatic precipitator, to withstand the environmental operating conditions of such an inductor member when so employed. If desired, and instead of passing conductor 22 through aperture 35, lead wire 18 can have a sufficient length to permit it to pass through aperture 35 for direct connection with forward support member 34, to provide the electrical connection between first inductor member 14 and conductor 22.

As seen in both FIGS. 2 and 3, the outermost cylindrical surfaces 36 of ferrite beads 32 are preferably spaced from the innermost cylindrical surface 13 of body member 12 to provide an air gap there between, and to permit dissipation of any condensation that might occur within second inductor 16. Additionally, the ferrite beads defining second inductor member 16 are preferably carried within body member 12, which because it is non-electrically conductive, avoids a possible shorting path that could result between ferrite beads 32 and adjacent structural elements. In that connection, because the ferrite beads are either reflecting or absorbing each bead and therefore the interposition of a non-electrically conductive material is desirable, because if a short circuit were to exist between the ferrite beads and adjacent structure, the effect of the ferrite would be eliminated.

Referring once again to FIG. 3, the end of conductor 22 that is most distance from first inductor member 14, and that is closest to connector 26, is electrically connected with output terminal connector 26. From a structural standpoint, connector 26 can include a transversely extending wall member 38 to which conductor 22 is connected in order to maintain conductor 22 in spaced relationship relative to inner surface 13 of body member 12. As shown, wall member 38 is a part of connector 26, although it can be a separate and independent supporting arrangement, if desired, so long as there is electrical connection between conductor 22 and connector 26. FIG. 3A shows another embodiment where the first part inductor 14 is mechanically separate, but connected electrically to the second part inductor 16 which is mechanically separate, consisting of end connectors 26 on both ends, outer tube 12 and internal assembly 36 and 22.

When inductor assembly 10 is installed as an element in an power-carrying conduit, first inductor member 14 provides an impedance sufficient to block or reduce low to moderate frequency voltage fluctuations (from about 1 Hz to about 10 kHz). Second inductor member 16 provides an impedance sufficient to block moderate and high frequency voltage fluctuations (from about 10 kHz to about 10 MHz). Each provides its effect independent of the other. Such voltage fluctuations can be found in the power output provided by a transformer/rectifier set of an electrostatic precipitator power supply.

When installed in the output side of the power supply circuit for an electrostatic precipitator, inductor assembly 10 operates to block (by reflection or absorption) or to reduce voltage ripples that would otherwise flow from the output of the transformer/rectifier set to an electrostatic precipitator electrode, and that could lead to sparking, and possibly damaging arcing. Typically, ripple voltages in such devices are about 50% of the nominal voltage (or 25 kV of voltage ripple for a nominal 50 kV transformer/rectifier set), and the two-stage inductor assembly operates to reduce that ripple voltage by up to about 50%, to provide a significant reduction in precipitator operating cost and maintenance, as well as a significant reduction in stack gas opacity. When installed in the power supply circuit for an electrostatic precipitator, it is preferred from an efficiency of operation standpoint that the two-stage inductor in accordance with the present invention be placed as close to the precipitator electrode as possible.

If analysis of the power supply circuit to the electrostatic precipitator electrode shows that the existence of high frequency energy and not low frequency energy, a filter can be provided consisting of one or more second inductor members 16. If low frequency energy is not present, the first inductor member 14 need not be supplied. Conversely, if the power supply circuit to the electrostatic precipitator electrode shows that the existence of low frequency energy and not high frequency energy, a filter can be provided consisting of one or more first inductor members 14. If high frequency energy is not present, the second inductor member 16 need not be supplied.

Examples of the circuit elements sometimes provided between a transformer/rectifier set and electrostatic precipitator electrodes are shown in U.S. Pat. No. 4,996,471, which issued on Feb. 26, 1991, to Frank Gallo. However, inductive elements $L_2$ and $L_4$ as shown in the Gallo U.S. Pat. No. '471 are commonly provided by the manufacturer of the transformer/rectifier set, and they provide no filtering but serve only to limit output current peaks to a value deemed "safe" based upon peak current surge rating of the rectifiers CR2, CR4, CR6, and CR8.

The incorporation of a two-stage inductor assembly in the output portion of the power circuit of a transformer/rectifier set in an electrostatic precipitator has been found to greatly reduce particulate emissions resulting from fossil fuel combustion in boilers, and the like. For example, in actual testing in an electrical generating station, the incorporation into the power output portion of the circuit of a two-stage inductor assembly having the construction shown in FIGS. 1 through 3 was found in actual operation to provide a reduction in the stack gas opacity from about 20% to about 13%. At the same time, the power required to operate the precipitator was reduced by about 40%. Moreover, because the inductor assembly provides substantial smoothing of the output voltage from the transformer/rectifier set, arcing was significantly reduced, resulting in an increase in effective collection time for the precipitator. Additionally, downtime for the generating plant cause by arcing was also reduced, thereby improving both the operating efficiency of the generating plant and also the particulate separation efficiency of the electrostatic precipitator.

Furthermore, in actual commercial practice many electrostatic precipitators must have sulfur trioxide and ammonia injected into the combustion product stream in order to assist in maintaining the stack gas opacity as low as possible. The present invention can reduce the need for the injection of such caustic gases, thereby reducing the cost for plant operation, and reducing the otherwise necessary maintenance resulting from the use of caustic gases.

Figure 4:
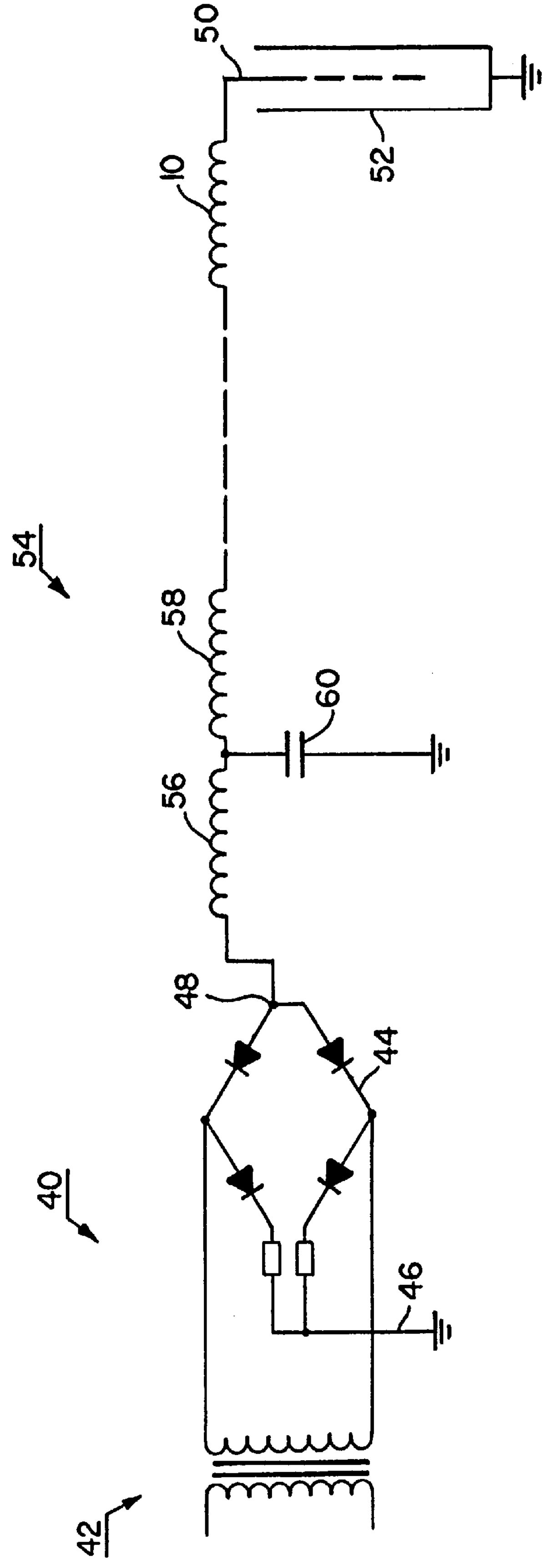
FIG. 4 is a circuit diagram of a T-type filter connected to a two-stage, high voltage inductor.

In addition to the beneficial results flowing from the incorporation into an electrostatic precipitator of the two-stage inductor assembly it has been found that the addition to the power output circuit of a T-type filter as shown in FIG. 4 results in an additional reduction in the AC ripple current and voltage, thereby further improving the collection efficiency and power consumption of the precipitator, while simultaneously reducing the tendency toward sparking and arcing. In that regard, filter 54, in addition to the T-type filter arrangement shown in FIG. 4, can also be a filter of the pi circuit type. With properly chosen filter elements of either filter type, ripple voltage can be reduced by two to five times or more compared with the reduction obtained by installing the two-stage inductor assembly alone. Typical ripple voltage with the inductor assembly 10 and filter 54 installed is reduced from about 25,000 volts peak to peak to less than about 10,000 volts peak to peak in a 50 kV transformer/rectifier set.

Figure 6:
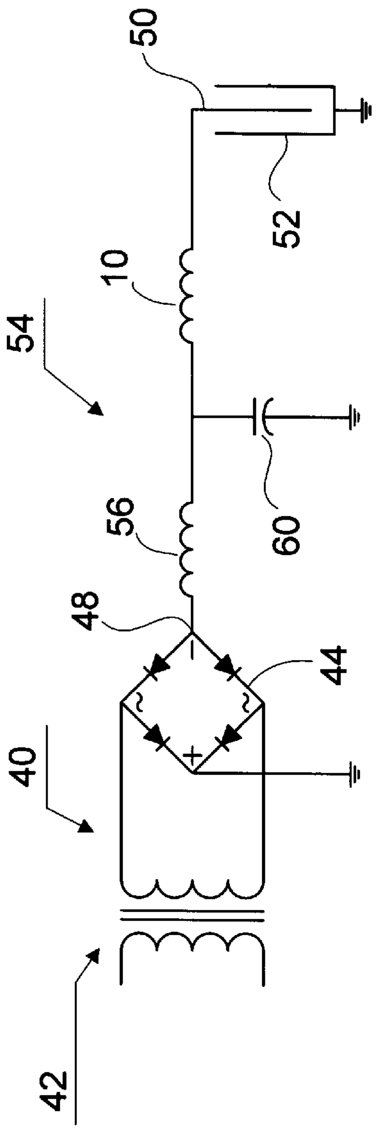
FIG. 6 is a circuit diagram of a T-type filter where the second inductor is part of a two stage inductor assembly.

One type of circuit in which the two-stage inductor assembly 10 can be advantageously utilized is shown schematically in FIGS. 4 and 6. As shown a transformer/rectifier set 40 includes a high voltage transformer 42 that has its output connected with a high-voltage rectifier bridge 44. One output terminal 46 of bridge 44 is grounded and the other output terminal 48 is electrically connected with a high voltage electrostatic precipitator electrode 50, to provide with grounded electrode 52 a negatively-charged, high voltage field through which combustion or other process gases are passed and from which particulates are desired to be separated.

Immediately before precipitator electrode 50 in the power supply circuit, a two-stage inductor assembly 10 can be provided. The connection between inductor assembly 10 and the output terminal 48 can be effected through a filter 54, which is the subject of the present invention, and provides further reduction of the ripple component of the output voltage from transformer/rectifier set 40. Filter 54 can be a T-type filter that includes a pair of series connected inductors 56, 58 with a capacitor 60 extending from a junction between the two inductors to ground. Inductors 56 and 58 can have an inductance from about 0.1 to about 12.5 henries each, and are of about the same inductance. The preferred embodiment uses 1 H inductors. The capacitor 60 can have a capacitance of from about 0.01 to about 0.1 $\mu$F. Capacitance should be selected to be substantially the same as the measured capacitance between the high voltage electrodes 50 and ground electrodes 52, and are typically on the order of about 0.05 $\mu$F.

Figure 5:
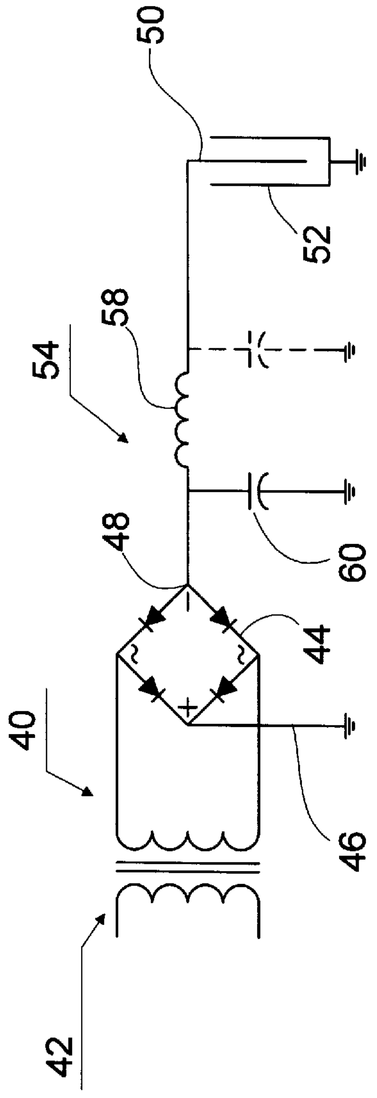
FIG. 5 is a circuit diagram of pi-type filter used in an electrostatic precipitator circuit.

The filters 54 in FIGS. 4 through 6 can be provided with or without an inductor 10. The filters 54 may also be provided with only one stage of the two-stage inductor 10. That is, the filter 54 can be connected in series with one or more first inductor member 14 or one or more second inductor member 16, depending on the electrical characteristics of the existing system.

Measurements of the existing system should also reveal its response frequency, f. From f and the measured capacitance, the inductance required in the present invention is calculated from the equation $$f=(2\pi(LC)^{1/2})^{-1}.$$

In FIG. 5, a capacitor 60 is connected between ground and inductor 58, forming a pi-type filter circuit 54 with the effective capacitance of the precipitator as the second leg of the pi. A second capacitor is shown in dashed lines to represent the capacitative effect of the precipitator. The use of the two-stage inductor 10 is optional and could be used to replace the separate inductor element 58 as shown in FIG. 6. The first inductor 56, shown in FIGS. 4 and 6, is not required in this circuit. The capacitance of the first capacitor is typically between about 0.01 $\mu$F and about 0.1 $\mu$F and is typically about 0.05 $\mu$F. This will be change with each individual precipitator.

The embodiment of FIG. 6 is very similar to the embodiment of FIG. 4. In FIG. 6, the two part inductive element 10 is used to replace inductor 58.

It will be apparent to those skilled in the art that various changes and modifications can be made without departing from the spirit of the present invention. Accordingly, it is intended to encompass within the appended claims all such changes and modifications that fall within the scope of the present invention.

We claim:

1. An electrostatic precipitator power circuit comprising a transformer-rectifier set, electrically connected in series to an inductor member defined by a plurality of ferrite beads positioned in end-to-end relationship, electrically connected to an electrostatic precipitator electrode.

2. An electrostatic precipitator power circuit comprising a transformer-rectifier set, electrically connected in series to a T-type filter, the T-type filter electrically connected to an electrostatic precipitator electrode.

3. The circuit of claim 2, said T-type filter comprising a first inductor electrically connected in series to a second inductor at a terminal, and a capacitor electrically connected between ground and the terminal.

4. The circuit of claim 3, wherein said capacitor has a capacitance between 0.01 μF and 0.1 μF.

5. The circuit of claim 3, wherein the inductance of the first and second inductors is between 0.1 H and 12.5 H.

6. The circuit of claim 2 further comprising a two-stage inductor assembly electrically connected in series between the T-type filter and the electrostatic precipitator electrode, said inductor assembly comprising a first inductor member defined by a plurality of turns of a continuous length of wire; and a second inductor member defined by a plurality of ferrite beads positioned in end-to-end relationship, wherein the first and second inductor members are electrically connected in series.

7. An electrostatic precipitator power circuit comprising a transformer-rectifier set, electrically connected in series to a pi-type filter, the pi-type filter electrically connected to an electrostatic precipitator electrode.

8. The circuit of claim 7, said pi-type filter comprising a first capacitor having a first terminal connected to the transformer-rectifier set and a second terminal which is connected to ground, and an inductor member electrically connected to the first capacitor terminal with its second terminal electrically connected to the electrostatic precipitator electrode, such that the precipitator electrode forms a second leg of the pi.

9. The circuit of claim 8, said pi-type filter further comprising a second inductor member connected in series between the filter and electrostatic precipitator electrode.

10. The circuit of claim 3, wherein the inductance of the first and second inductors is between 0.1 H and 12.5 H.

11. The circuit of claim 9, wherein the inductance of the first and second inductors is between 0.1 H and 12.5 H.

12. The circuit of claim 7 further comprising a two-stage inductor assembly electrically connected in series between the pi-type filter and the electrostatic precipitator electrode, said inductor assembly comprising a first inductor member defined by a plurality of turns of a continuous length of wire; and a second inductor member defined by a plurality of ferrite beads positioned in end-to-end relationship, wherein the first and second inductor members are electrically connected series.

13. The circuit of claim 8, wherein the capacitance of the first capacitor is between 0.01 μF and 0.1 μF.

* * * * *